United States Patent [19]
Komorowski et al.

[11] 3,884,956
[45] May 20, 1975

[54] PROCESS FOR THE MANUFACTURE OF 2,4-DICYANO-3,5-DIMETHYLANILINE
[75] Inventors: Klaus Komorowski, Cologne; Peter Kurtz, Tegernsee, both of Germany
[73] Assignee: Bayer Aktiengesellschaft, Leverkusen, Germany
[22] Filed: May 18, 1973
[21] Appl. No.: 361,507

[30]   Foreign Application Priority Data
       May 6, 1972   Germany............................ 2222381

[52] U.S. Cl............. 260/465 E; 260/155; 260/156; 260/163; 260/165; 260/205; 260/999
[51] Int. Cl............................................ C07c 121/78
[58] Field of Search ................................ 260/465 E

[56]         References Cited
       FOREIGN PATENTS OR APPLICATIONS
       958,922    2/1957   Germany

*Primary Examiner*—Lewis Gotts
*Assistant Examiner*—Dolph H. Torrence
*Attorney, Agent, or Firm*—Plumley & Tyner

[57]            ABSTRACT

Preparation of 2,4-dicyano-3,5-dimethylaniline by heating β-methyleneglutaric acid dinitrile or β-methyl-glutaconic acid dinitrile or mixtures of these dinitriles to temperatures above 100°C in the presence of basic catalysts. The resulting aniline is a starting material for the production of valuable azo dyestuffs.

7 Claims, No Drawings

PROCESS FOR THE MANUFACTURE OF 2,4-DICYANO-3,5-DIMETHYLANILINE

It has been found that 2,4-dicyano-3,5-dimethylaniline is obtained in very good yields in a one-pot reaction if β-methyleneglutaric acid dinitrile or β-methylglutaconic acid dinitrile or mixtures of these dinitriles — optionally in an inert solvent — are heated to temperatures above 100°C in the presence of basic catalysts.

The course of the reaction can be illustrated in more detail by the following equation:

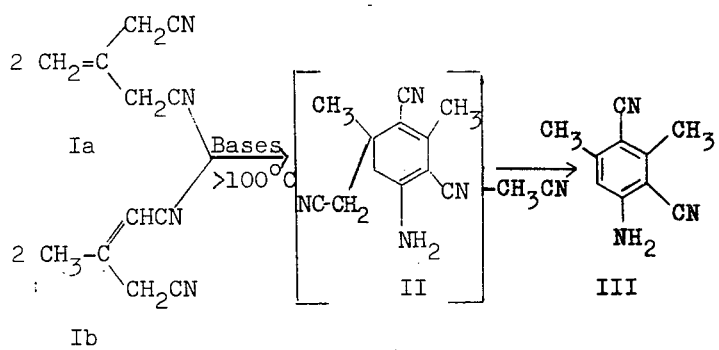

It must be described as distinctly surprising that the relatively complicated amine (III), which it has not hitherto been possible to prepare in a conventional manner, is obtained in this simple manner.

Admittedly it is already known from German Patent Specification 958,922 to allow basic catalysts to act on the dinitriles (I), but the reaction described therein, which is carried out at relatively low temperatures (below 100°C) only leads to a dimer of the dinitriles (I), which, according to our own more recent analytical investigations, should not be allotted the straight-chain structure proposed in the cited German Patent Specification but the cyclic structure indicated for the intermediate product (II) postulated above.

The cyclisation reaction according to the invention is preferably carried out without solvents at temperatures above 100°C, especially at 100° to 120°C.

The reaction can however also be carried out with equally good success in the presence of high-boiling solvents, admittedly at temperatures above 140°, preferably 140°–220°C.

Examples of suitable high-boiling solvents are: dichlorobenzene, trichlorobenzene, dichlorotoluene, dimethylformamide, dimethylacetamide, ethylene glycol, diethylene glycol, glycol monomethyl ether, tetralin, decalin, diphenyl ether and others. It is however also possible to employ lower-boiling solvents — such as methanol, ethanol, dioxane, diethyl ketone and water — but in that case the reaction must be carried out in an autoclave under pressure.

Possible basic catalysts are alkali and alkaline earth hydroxides, alcoholates, phenolates, cyanides and amides, as well as ammonia and organic bases.

As examples there may be mentioned: NaOH, KOH, Ca(OH)$_2$, NaOCH$_3$, NaOC$_2$H$_5$, NaOC$_3$H$_7$, KOCH$_3$, KOC$_2$H$_5$, KOC$_4$H$_9$—(tert.), NaOC$_4$H$_9$(n), NaOC$_4$H$_9$(-tert), NaOC$_6$H$_5$, KOC$_6$H$_5$, NaNH$_2$, KCN, NH$_3$, dimethylamine, diethylamine, trimethylamine, triethylamine, morpholine, piperidine and pyrrolidine.

The bases are appropriately used in amounts of 0.001 mol per cent to 2 mol per cent, relative to the dinitriles (I).

The reaction product (III) according to the invention is a valuable intermediate product for the manufacture of pesticides and above all of dyestuffs, preferably azo dyestuffs.

For example, in order to manufacture azo dyestuffs, the new aniline derivative (III) is diazotised and coupled, in a known manner, with customary coupling components of the aniline, pyridone, quinoline, indole or pyrazolone series.

The process according to the invention will be explained in more detail with the aid of the examples which follow.

EXAMPLE 1

70 g (0.66 mol) of β-methyleneglutaric acid dinitrile are dissolved, at room temperature, in 650 g = 450 ml of 1,2,4-trichlorobenzene and 3 g of NaOCH$_3$ are added. The light brown solution is stirred for 30 minutes at 80°C and is thereafter rapidly heated to the boil (218°C), whilst distilling off the acetonitrile liberated. After reaching the boiling point, the mixture is filtered hot (approx. 7.0 g of insoluble residue). On cooling the mother liquor to room temperature, 43 g (dry weight) of 2,4-dicyano-3,5-dimethylaniline of melting point 205°–208°C crystallise as brownish crystals. Yield: 76% of theory. (The yield can be improved to approx. 85% by concentrating the mother liquor). An analytically pure product of melting point 210°–211°C can be obtained from the crystals by high vacuum sublimation.

EXAMPLE 2

70 g of β-methyleneglutaric acid dinitrile are dissolved in 135 ml (148 g) of ethylene glycol at 70°–80°C and 5 g of NaOCH$_3$ are added slowly. Thereafter the mixture is rapidly heated to 170°C and the acetonitrile thereby liberated is distilled off. The mixture is then poured out, whilst hot, onto 300 ml of ice/H$_2$O and the product is filtered off and washed with water until neutral. Yield: 47.6 g = 84.3%. Brownish-yellow crystals of melting point 205°–206°C, which are pure enough for further conversion into azo dyestuffs.

Similarly good results are achieved on using the solvents and basic catalysts mentioned in the preceding description. The following experimental results, listed in the form of a table, may be mentioned by way of example.

| No. | Dinitrile in g | Base | | Temperature °C | Solvent | Yield in % |
|---|---|---|---|---|---|---|
| a | 70 g Ia | NaOCH₃ | 5 g | 180 | Diethyl glycol 135 ml | 95 |
| b | 20 g Ib | do. | 5 g | 210 | do. | 93 |
| c | 20 g Ib | do. | 5 g | 170 | Glycol 135 ml | 87 |
| d | 70 g Ia | do. | 5 g | 150 | DMF[2] 50 ml | 89 |
| e | 35 g Ia 35 g Ib | do. | 5 g | 150 | do. | 89 |
| f | do. | Triton B[1] | | 170 | Trichlorobenzene | 90 |
| g | 70 g Ia | Triethylamine | | 210 | do. | 90 |
| h | 70 g Ia | NaOCH₃ | 5 g | 210 | Methanol (in an autoclave) | 80 |
| i | 70 g Ia | KOC₄H₉ | 10 g | 250 | Glycol | 95 |
| j | 70 g Ia | NaOCH₃ | 5 g | 170 | — | 89 |
| k | 70 g Ib | NaOCH₃ | 4 g | 140 | — | 92 |

[1] Benzyltrimethylammonium hydroxide
[2] Dimethylformamide

EXAMPLE 3

5 g of NaOH dissolved in 30 ml of water are added to 70 g of fused β-methyleneglutaric acid dinitrile at 90°C. The temperature of the reaction mixture rises to 105°C. The mixture is stirred for 5 minutes and poured out onto ice/water and the product is filtered off and washed until neutral.

53 g = 98% of 2,4-dicyano-3,5-dimethylaniline of melting point 202°–204°C are obtained.

We claim:

1. Process for the preparation of 2,4-dicyano-3,5-dimethylaniline, comprising the steps of heating β-methyleneglutaric acid dinitrile or β-methylglutaconic acid dinitrile or a mixture thereof in the presence or absence of inert solvent to a temperature above 100°C in the presence of a basic catalyst under conditions sufficient to form 2,4-dicyano-3,5-dimethylaniline; and recovering said 2,4-dicyano-3,5-dimethylaniline.

2. The process of claim 1 in which said basic catalyst is an alkali metal hydroxide, alcoholate, phenolate, cyanide or amide; an alkaline earth hydroxide, alcoholate, phenolate, cyanide or amide; ammonia or organic base.

3. The process of claim 1 in which said basic catalyst is NaOH, KOH, Ca(OH)₂, NaOCH₃, NaOC₂H₅, NaOC₃H₇, KOCH₃, KOC₂H₅, KOC₄H₉—(tert.), NaOC₄H₉(n), NaOC₄H₉(tert.), NaOC₆H₅, KOC₆H₅, NaNH₂, KCN, NH₃, dimethylamine, diethylamine, trimethylamine, triethylamine, morpholine, piperidine or pyrrolidine.

4. The process of claim 2 in which the basic catalyst is present in an amount 0.001 to 2 mol percent of said dinitrile.

5. The process of claim 1 in which the reaction is carried out without solvents at temperatures of 100° to 120°C.

6. The process of claim 1 in which the basic catalyst is an alkali alcoholate.

7. The process of claim 1 which is continuous and free of any step of separation an intermediate compound.

* * * * *